United States Patent
Coskun et al.

(10) Patent No.: US 6,944,452 B2
(45) Date of Patent: Sep. 13, 2005

(54) APPARATUS AND METHOD FOR HARD HANDOFF OF DATA PACKET TRANSMISSIONS

(75) Inventors: Risvan Coskun, Ottawa (CA); Jagdish Venkata Sonti, Cupertino, CA (US); Henry S. Lee, Gloucester (CA); Goran G. Janevski, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 627 days.

(21) Appl. No.: 09/746,188

(22) Filed: Dec. 26, 2000

(65) Prior Publication Data

US 2002/0082018 A1 Jun. 27, 2002

(51) Int. Cl.[7] .................................................. H04Q 7/20
(52) U.S. Cl. ........................ 455/436; 455/438; 455/450
(58) Field of Search ................................. 455/450, 436, 455/437, 438, 439; 370/331, 332, 334, 443, 444

(56) References Cited

U.S. PATENT DOCUMENTS

| | | | | |
|---|---|---|---|---|
| 5,355,367 | A | * 10/1994 | Comroe et al. | ............. 370/329 |
| 6,282,429 | B1 | * 8/2001 | Baiyor et al. | ............... 445/512 |
| 6,314,293 | B1 | * 11/2001 | Servi et al. | .................. 455/450 |
| 6,526,030 | B2 | * 2/2003 | Rezaiifar et al. | ........... 370/335 |
| 6,708,031 | B2 | * 3/2004 | Purnadi et al. | ............. 455/436 |

* cited by examiner

Primary Examiner—Temica Beamer

(57) ABSTRACT

Within a hard handoff procedure of a mobile terminal from a first radio sector to a second radio sector, a handoff manager requests the allocation of network resources associated with the second radio sector for the mobile terminal. If the second radio sector does not have sufficient network resources to support the mobile terminal, the handoff manager instructs the mobile terminal to switch into a dormant mode. By doing this, the handoff manager can delay the disconnection of the packet data session until there is sufficient network resources or until an internal packet data protocol error occurs due to a request timing out. In the case that sufficient resources become available, the handoff manager instructs the mobile terminal to return to a connected mode. One advantage of this procedure is the reduced need to re-establish a data packet session in cases that there is a temporary lack of sufficient network resources during a hard handoff.

23 Claims, 7 Drawing Sheets

APPARATUS AND METHOD FOR HARD HANDOFF OF DATA PACKET TRANSMISSIONS

FIELD OF THE INVENTION

This invention relates generally to allocating network resources to a mobile terminal and, in particular, to apparatus and methods used for allocating network resources to a mobile terminal during a packet hard handoff.

BACKGROUND OF THE INVENTION

With the deployment of third generation cellular systems, operators will be able to provide an extensive number of data services to cellular subscribers. With these new data services, each subscriber will be competing for both signalling channels along with fundamental and supplemental traffic channels (hereinafter referred to together as traffic channels) for bulk data transfers based on user profile privileges. This increase in demand for bandwidth will result in a decrease in available network resources and potentially an increase in the occurrences in which insufficient bandwidth is available for all connections within a particular sector and/or cell.

When a mobile terminal travels from a first coverage area to another coverage area, a competition for network resources may occur. The nature of the CDMA frequency reuse assumes an equal distribution of mobile terminals throughout the service area. However, in reality, unequal call loading frequently occurs, thus possibly causing a mobile terminal to have little choice but to drop its connection. If the mobile terminal is operating within a packet data session at the time its wireless connection is dropped, the packet data session will also be disconnected.

The establishment of data packet sessions require considerable signalling and the time required to re-establish a packet data session is inconvenient for customers. Thus, any technique to avoid the need to re-establish packet data sessions is important.

As currently designed, the handoff algorithms defined within standards and implemented within products currently utilized for voice communications are continuing to be used for the transmission of data packets. Unfortunately, data packet traffic and voice communications have different operating parameters that make the use of a common handoff technique potentially inefficient.

Hence, a new hard handoff technique is needed that takes advantage of the unique characteristics of packet data transmissions such that the need to re-establish a data packet session in cases of insufficient network resources (eg. overloaded cells/sectors) is reduced.

SUMMARY OF THE INVENTION

The present invention is directed to apparatus and method for allocating network resources associated with radio sectors within a wireless network to a mobile terminal. In embodiments of the present invention, by inquiring with a centralized Radio Resource Manager (RRM) within the wireless network, a handoff manager determines if a particular sector in which a mobile terminal is being handed off to has sufficient network resources to support the mobile terminal. If it does not have sufficient network resources, the handoff manager instructs the mobile terminal to switch into a dormant mode. By doing this, the handoff manager can delay the disconnection of the packet data session until there is sufficient network resources or until an internal packet data protocol error occurs due to a request timing out. In the case that sufficient resources become available, the handoff manager instructs the mobile terminal to return to connected mode while, in the case that an internal packet data protocol error occurs, the handoff manager can proceed to disconnect the old connection and the packet data session. One advantage of the present invention is the reduced need to re-establish a data packet session in cases that there is a temporary lack of sufficient network resources during a hard handoff procedure.

The present invention, according to a first broad aspect, is a computing apparatus arranged to operate within a wireless network including at least one radio sector in which mobile terminals can communicate. The computing apparatus includes network resource allocation logic that operates to request allocation of a network resource associated with the radio sector for the mobile terminal and to determine if the allocation of the network resource associated with the radio sector is successful. If the allocation fails, the network resource allocation logic further operates to request the mobile terminal be placed within a dormant mode.

In some embodiments of the present invention, the network resource allocation logic further operates to continue to request allocation of the network resource associated with the radio sector for the mobile terminal after the allocation has previously failed. Further, the network allocation logic operates to determine if the allocation of the network resource associated with the radio sector is successful after the allocation has previously failed and, if the allocation is successful, to request the mobile terminal be placed within a connected mode.

According to a second broad aspect, the present invention is a computing apparatus arranged to control allocation of network resources for a mobile terminal within a radio sector. In this aspect, the computing apparatus includes means for attempting allocation of a network resource associated with the radio sector for the mobile terminal, means for determining if the allocation of the network resource associated with the radio sector is successful and means for requesting the mobile terminal be placed within a dormant mode if the allocation of the network resource associated with the radio sector fails.

The present invention, according to a third broad aspect, is a method for allocating network resources associated with a radio sector to a mobile terminal. This method includes the steps of attempting to allocate at least one network resource associated with the radio sector to the mobile terminal and, if the allocation of the at least one network resource fails, requesting the mobile terminal be placed within a dormant mode.

The present invention, according to a fourth broad aspect, is a method for performing a hard handoff of a mobile terminal from a first radio sector to a second radio sector. This method includes determining if network resources of the second radio sector are sufficient for the mobile terminal. Further, if the network resources of the second radio sector are not sufficient for the mobile terminal, the method includes instructing the mobile terminal to be placed within a dormant mode until sufficient network resources for the mobile terminal are available.

According to a fifth broad aspect, the present invention is a wireless communication network including a Radio Access Port (RAP) that operates to communicate with mobile terminals within at least one radio sector and a computing apparatus. The computing apparatus, according to this aspect, operates to attempt to allocate a resource associated with the RAP to a mobile terminal and, if the attempt to allocate resources associated with the RAP to the mobile terminal fails, to request that the mobile terminal be placed within a dormant mode.

The present invention, according to yet a further aspect, is a wireless communication network including first and second Radio Access Ports (RAPs) that operate to communicate with mobile terminals within first and second radio sectors respectively and a computing apparatus. The computing apparatus, in this aspect, operates to detect if a mobile terminal communicating with the first RAP requires a hard handoff from the first radio sector to the second radio sector. Further, the computing apparatus operates to attempt to allocate a resource associated with the second RAP to the mobile terminal if a hard handoff is required. Finally, the computing apparatus yet further operates to request the mobile terminal be placed into a dormant mode if the attempt to allocate the resource fails.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which.

DETAILED DESCRIPTION OF THE PREFERRED EMBODIMENT

Embodiments of the present invention are directed to allocating network resources to mobile terminals and, in particular, to apparatus and methods used for allocating network resources to a mobile terminal during hard handoffs of data packet transmissions. Data packet transmissions have different properties when compared to well-known voice transmissions and as such can be treated in a slightly modified manner. The present invention takes advantage of the fact that data packet transmissions can, within advanced wireless standards, be put into a dormant state in order to reduce the need to tear down a connection when resources are not immediately available.

Within the developing CDMA standard, a Machine Access Control (MAC) is implemented that allows mobile terminal controlling components, such as a Radio Link Access (RLA) within the wireless network to instruct a mobile terminal to be placed within one of four well-known states, herein below referred to as cdma2000 modes. These cdma2000 modes comprise a "connected" mode in which both signalling and traffic channels are active; a "control hold" mode in which only a signalling channel is active; a "dormant" mode in which neither a signalling channel nor a traffic channel is active but a packet data session can be maintained; and a "null" mode in which no channels or sessions are active. In normal situations, the dormant mode is utilized during normal pauses within data requests during a packet data session. Within the present invention, this dormant mode is utilized to aid in hard handoffs as will be described herein below in detail.

Although the embodiments of the present invention as described herein below are specific to the cdma2000 standard, this should not limit the scope of the present invention. It should be understood that the present invention could be applied to any wireless standard that allows a mobile terminal to be put into a state of no communications while maintaining a packet data session.

Figure 1:
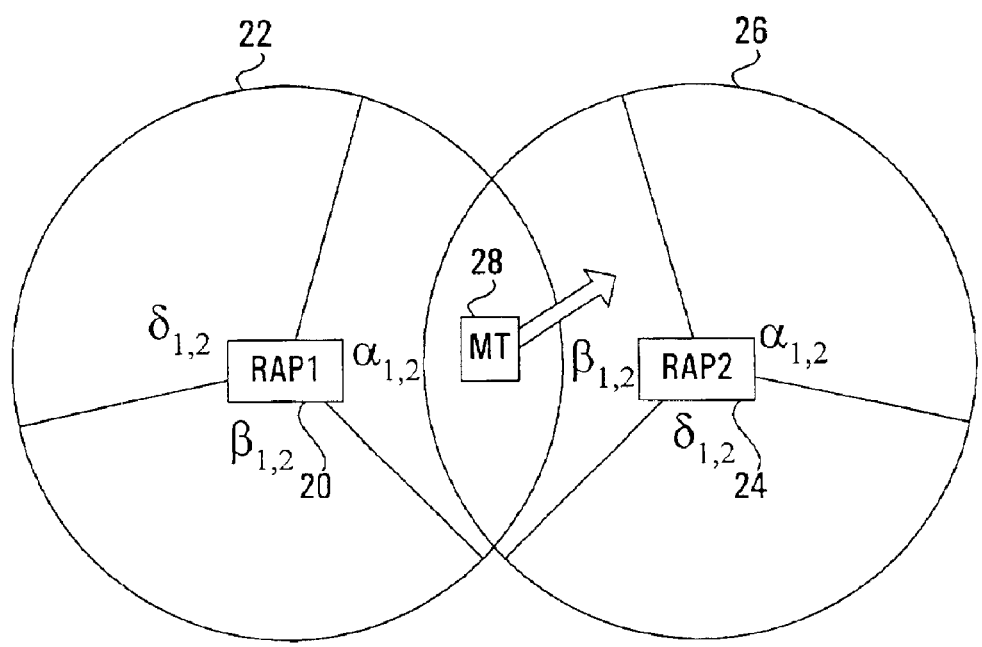
FIG. 1 is a block diagram illustrating two multi-sector, multi-carrier Radio Access Ports (RAPs) with overlapping coverage areas.

FIG. 1 is a block diagram of a wireless network in which two Radio Access Ports (RAP1, RAP2) 20, 24 have overlapping coverage areas 22, 26 respectively. As depicted, the first coverage area 22 for RAP1 20 has three equal sectors labelled $\alpha_{1,2}$, $\beta_{1,2}$ and $\delta_{1,2}$. Similarly, the second coverage area 26 for RAP2 24 has three equal sectors labelled $\alpha_{1,2}$, $\beta_{1,2}$ and $\delta_{1,2}$. In each of these coverage areas, the two numbers after the sector labels indicate that each sector has two carrier frequencies, frequencies 1 and 2. Further within FIG. 1, a Mobile Terminal (MT) 28 is depicted moving from the $\alpha_{1,2}$ sector of the first coverage area 22 to the $\beta_{1,2}$ sector of the second coverage area 26.

In the situation of FIG. 1, the RAP1 20 communicates with mobile terminals within its $\alpha_{1,2}$ sector at one of the carrier frequencies 1 and 2 and the RAP2 24 communicates with mobile terminals within its $\beta_{1,2}$ sector at one of the carrier frequencies 1 and 2. A MT moving from the $\alpha_{1,2}$ sector of the first coverage area 22 to the $\beta_{1,2}$ sector of the second coverage area 26 could be required to change carrier frequencies or may be able to stay within the same carrier frequency depending upon the resource utilization within the RAP2 24 with respect to its $\beta_{1,2}$ sector. If no carrier frequency change is required, the MT can possibly perform a soft handoff between the two sectors. If a carrier frequency change is required during the handoff procedure, the handoff from the RAP1 20 to the RAP2 24 must be a hard handoff since a MT can only communicate on a single carrier frequency at any one time. For the sample description of the present invention below, the MT 28 of FIG. 1 is assumed to be performing a hard handoff procedure as it moves from the $\alpha_{1,2}$ sector of the first coverage area 22 to the $\beta_{1,2}$ sector of the second coverage area 26.

A well-known hard handoff procedure that takes place within a wireless network for the situation depicted within FIG. 1 is described herein below with reference to FIG. 3, followed by a description of a modified hard handoff procedure according to an embodiment of the present invention with reference to FIG. 4. Prior to these descriptions of hard handoff procedures, a description of a possible wireless network that could have the present invention implemented is described with reference to FIG. 2 followed by a description of a possible packet data session initiation procedure within this wireless network.

Figure 2:
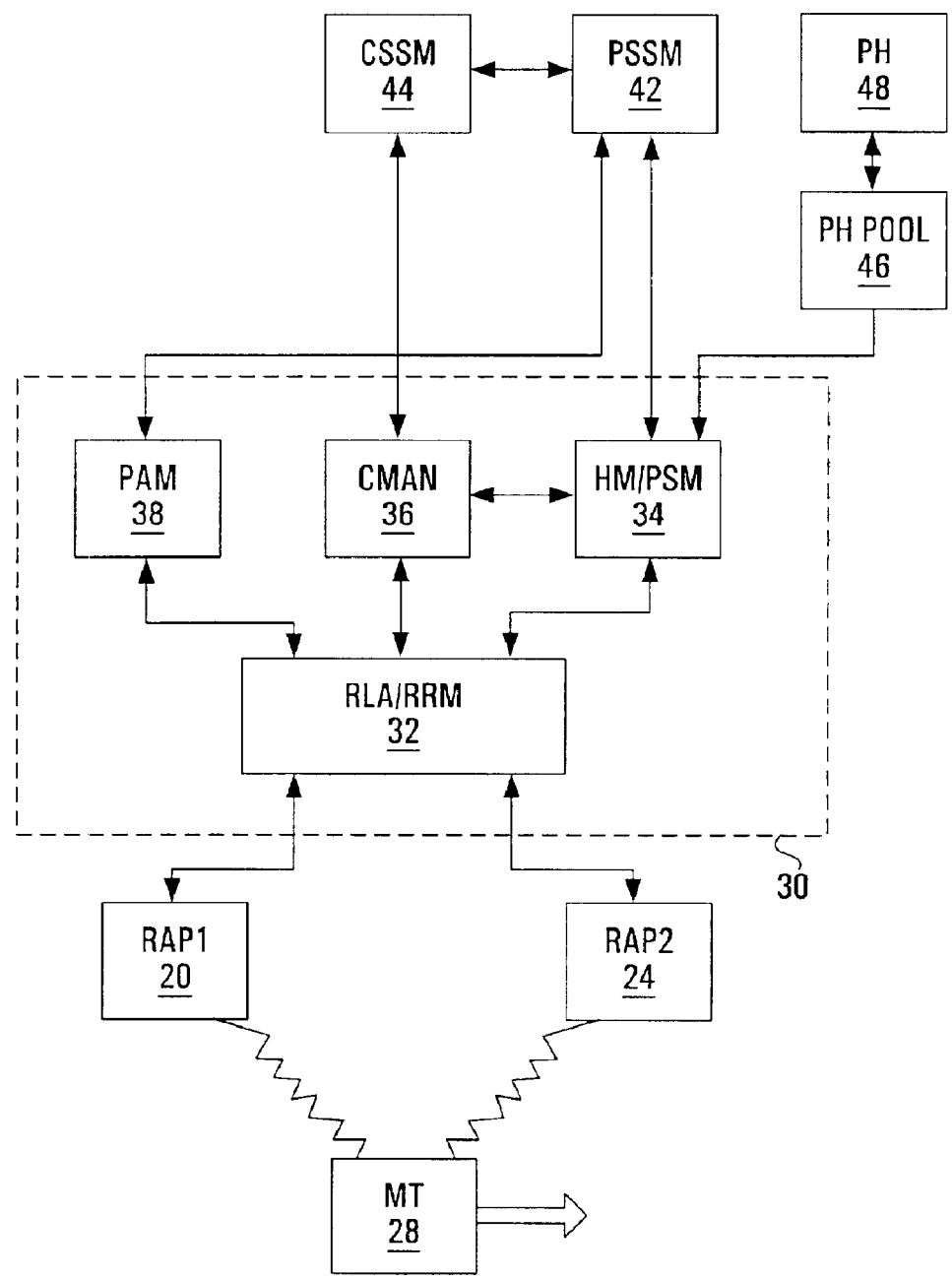
FIG. 2 is a block diagram illustrating a wireless network model in which the present invention could be implemented.

Within FIG. 2, the MT 28 is depicted moving away from the RAP1 20 towards the RAP2 24. In this figure, both the RAP1 20 and the RAP2 24 are coupled to a RAP control apparatus 30 and more specifically to a Radio Link Access/Radio Resource Manager (RLA/RRM) 32 within the RAP control apparatus 30. Further, the RAP control apparatus 30 comprises a Handoff Manager/Packet Session Manager (HM/PSM) 34 coupled to the RLA/RRM 32; a Connection MANager (CMAN) 36 coupled independently to the RLA/RRM 32 and the HM/PSM 34; and a Paging and Access Channel Manager (PAM) 38 coupled to the RLA/RRM 32. Also within the wireless network of FIG. 2 is a Packet Switch Subscriber Manager (PSSM) 42 coupled to both the PAM 38 and the HM/PSM 34; a Circuit Switch Subscriber Manager (CSSM) 44 coupled to both the CMAN 36 and the PSSM 42; a Packet Handler (PH) Pool 46 coupled to the HM/PSM 34; and a PH 48 coupled to the PH Pool 46.

The wireless network configuration of FIG. 2 and the normal operation of its components would be well-known by a person skilled in the art. One such well-known normal operation of its components is the establishment of a packet data session between the MT 28 and a packet-based network (not shown) upon request. This well-known procedure for establishing a wireless packet data session comprises numerous operational steps with considerable control signalling. As described previously, in normal operation, if a lack of sufficient resources occurs during a packet data session, the session is terminated, thus requiring the numerous operational steps to be performed again in order to re-establish the session when sufficient resources are available.

As will be described herein below, one advantage of the present invention is the reduced need to re-establish a packet data session in the case of a temporary lack of sufficient resources occurring during a hard handoff. To emphasize the importance of this advantage of the present invention, a possible set of operational steps performed in order to establish a packet data session is now summarized below.

Firstly within a packet data session initiation procedure, the MT 28 requests a packet session by sending a service request message to the PSSM 42 via the RAP1 20, RLA/RRM 32 and PAM 38; the RAP1 20 encapsulating MT identification and Class Of Service (COS) information within the Service Request message, the RLA 32 re-assembling the message from the radio link frames and the PAM inserting routing area and sector information into the Service Request message. Next, the PSSM 42 sends a Dedicated Signalling Channel (DSC) allocate request, via the CMCN 44, to the CMAN 36 which results in the required DSC for the MT 28 being assigned by the CMAN 36.

Subsequently, the PSSM 42 obtains the profile of the MT 28 according to its MT identification information and exchanges wireless access authentication information with the MT 28 via the DSC. If the authentication process is successful, the PSSM 42 updates the current location of the MT 28 and performs COS screening, performs service negotiations with the MT 28 to decide on an agreed COS and defines a routing policy for determining a Wireless Gateway Node (WGN) (not shown). If the requested service can be supported, the PSSM 42 then sends a Data Traffic Channel (DTC) allocate request to the HM/PSM 34 to set-up the DTC (also known as the bearer path).

At this point, the HM/PSM 34 creates a packet session, determines a PH Pool 46 for delivering the packets and requests the PH Pool 46 to allocate a PH 48. Further, the HM/PSM 34 requests the RLA/RRM 32 to allocate and assign a DTC to the MT 28. This DTC request includes forwarding identification information, sector information and an encryption parameter for the MT 28 and the address of the PH 48 that has been allocated for the MT 28. The RLA/RRM 28 subsequently stores the encryption parameter and the address of the PH 48 and responds to the PSSM 40 indicating that the DTC establishment was successful.

Next, the HM/PSM 34 sends a DTC allocate response to the PSSM 42 indicating that the DTC was successfully established. The PSSM 42 then sends a service response message, via the PAM 38, RLA/RRM 32 and RAP1 20, to the MT 28 indicating that the requested packet data session has been created. When the RLA/RRM 32 and the MT 28 receive this service response message, they initialize a Radio Link Protocol (RLP) on both sides of the radio interface and the MT 28 obtains its Internet Protocol (IP) address. In this process, the HM/PSM 34 learns the IP address of the MT 28, correlates the IP address with the MT address of the MT 28 and updates the PH 48 with this IP address. At this point, the MT 28 would be in the connected mode with a packet data session established.

It should be recognized that although the procedure above is one possible set of operations performed to establish a packet data session, there are other possible procedures to set-up such a session. The above description is simply a description of one possible wireless packet data session initiation procedure for a particular wireless standard that illustrates the complexity of establishing a packet data session within a wireless network.

A well-known hard handoff procedure is now described with reference to FIG. 3 followed by a description of a possible modified hard handoff procedure according to the present invention with reference to FIG. 4. FIG. 3 is a signalling diagram illustrating a set of control signalling messages performed during a well-known hard handoff procedure while FIG. 4 is a signalling diagram illustrating a subset of the control signalling messages of FIG. 3 that are modified for a sample implementation of the present invention. For these signalling diagrams, it is assumed that the packet data session described above has previously been initiated.

Figure 3:
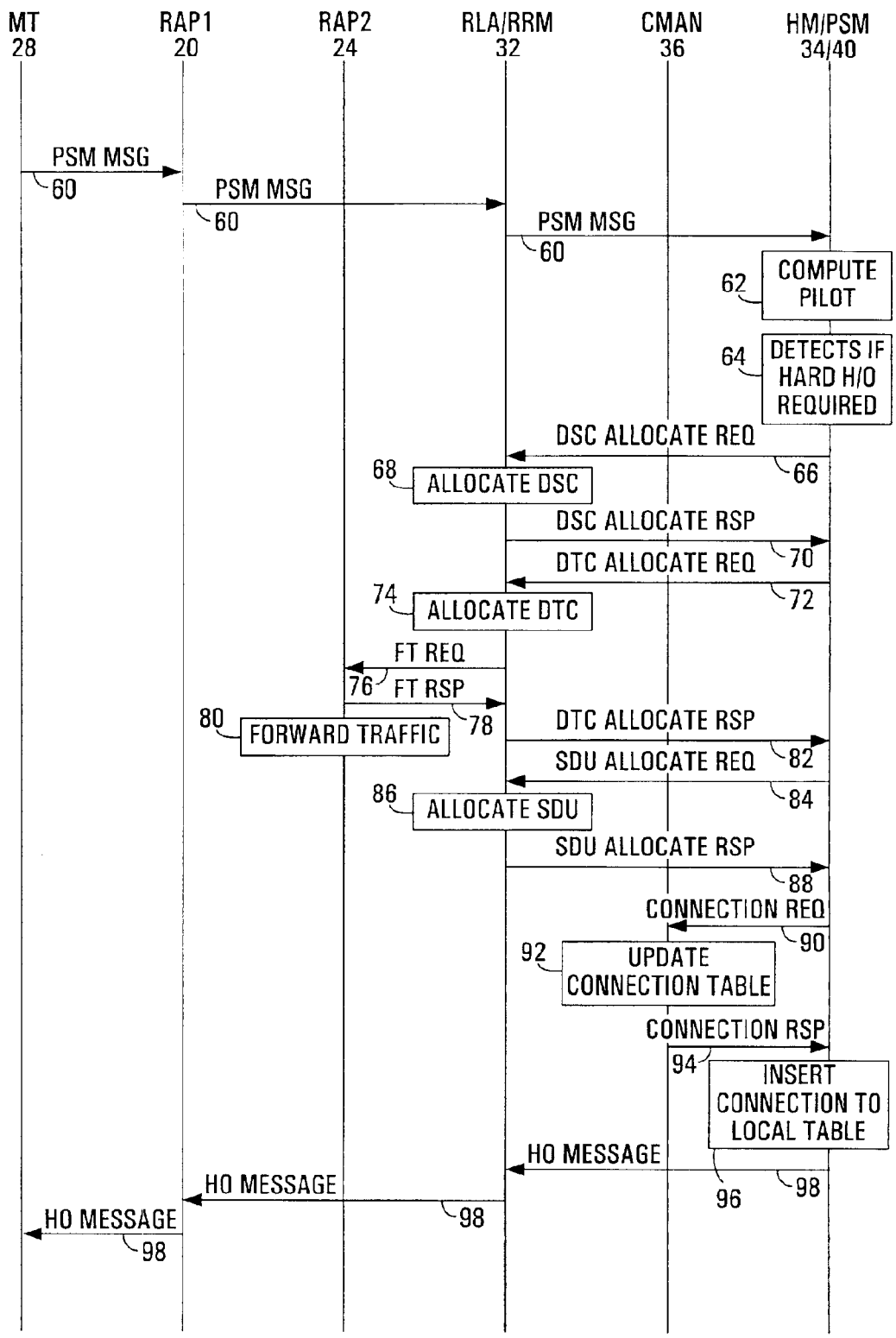
FIG. 3 is a signalling diagram illustrating a set of control signalling messages performed during a well-known hard handoff procedure.
Figure 3:
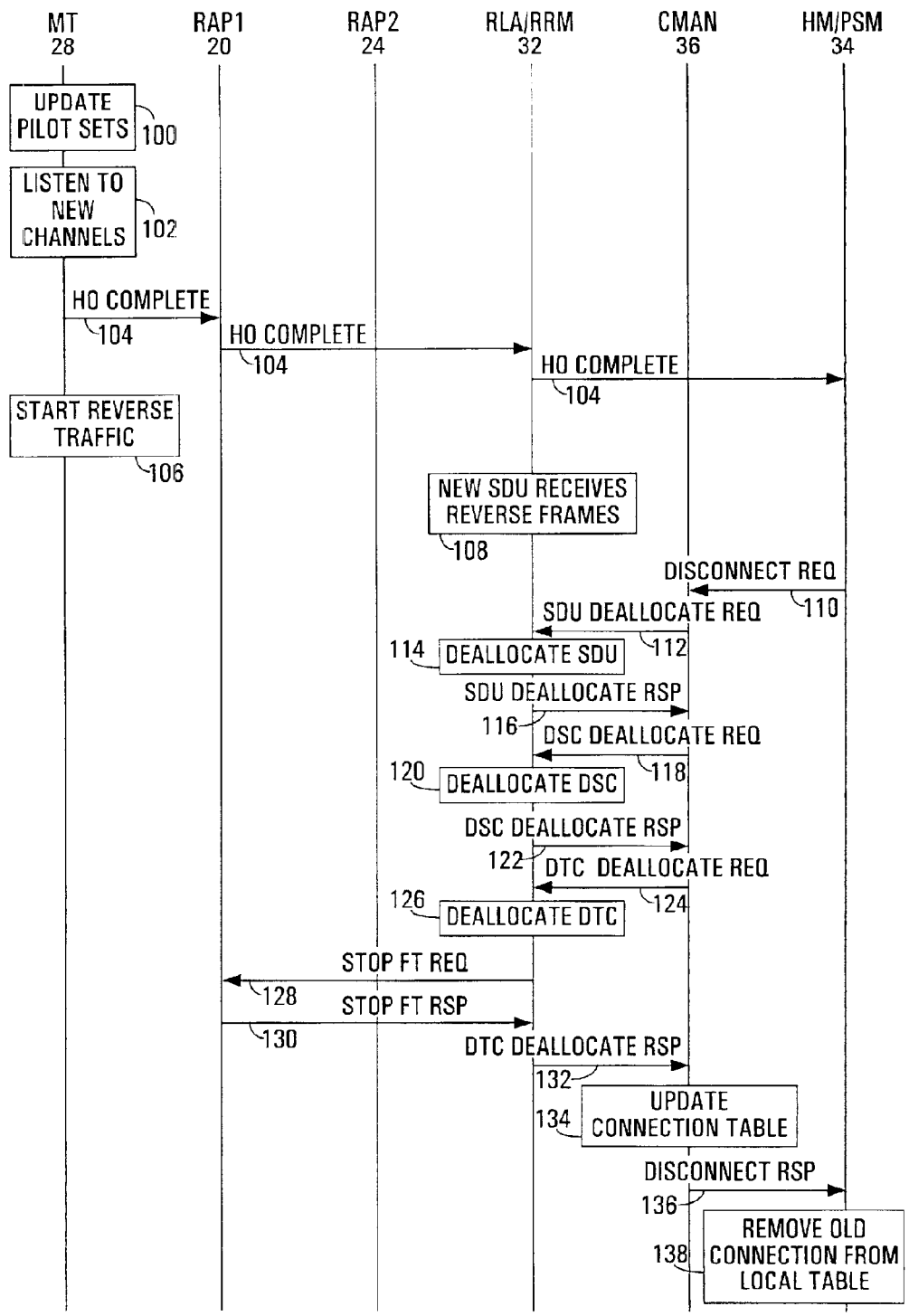

Initially within the well-known hard handoff procedure of FIG. 3, the MT 28 detects a new pilot signal sufficient for call processing within the $\beta_{1,2}$ sector of the RAP2 24 and sends a Pilot Strength Measurement (PSM) message 60 to the RAP1 20. This PSM message 60 is sent in-band within the established DSC or alternatively, is sent out-of-band within the established DTC. The PSM message 60 includes identification information for the MT 28; pilot strength measurements for both the original $\alpha_{1,2}$ sector within the first coverage area 22 and the new $\beta_{1,2}$ sector within the second coverage area 26; and the pilot set.

Once the RAP1 20 receives the PSM message 60, it forwards the PSM message 60 to the RLA/RRM 32 where the RLA re-assembles the message, converts the air interface frames into a signalling packet and forwards the PSM message 60 to the HM/PSM 34. The HM/PSM 34 computes pilot sets at step 62 within FIG. 3 and detects whether a hard handoff is required at step 64. If the HM/PSM 34 determines that a hard handoff is required at step 64, the HM/PSM 34 sends a DSC allocate request 66 to the RLA/RRM 32, the DSC allocate request 66 requesting a DSC to be allocated for the MT 28 in the new $\beta_{1,2}$ sector. The RLA/RRM 32 then determines whether there are sufficient resources for the requested DSC and, if there are sufficient resources, the RLA/RRM 32 allocates the DSC to the MT 28 at step 68. The RLA/RRM 32 subsequently sends a DSC allocate response 70 to the HM/PSM 34 that indicates that the requested DSC allocation is complete.

Next, as depicted in FIG. 3, the HM/PSM 34 sends a DTC allocate request 72 to the RLA/RRM 32 to request the allocation of a DTC within the new $\beta_{1,2}$ sector for the MT 28. Similar to step 68, the RLA/RRM 32 then determines whether there are sufficient resources for the requested DTC and, if there are sufficient resources, the RLA/RRM 32 allocates the DTC to the MT 28 at step 74. After the DTC is allocated, the RRM requests the RAP2 24 to forward data traffic to the MT 28 with a Forward Traffic (FT) request 74 and the RAP2 24 acknowledges with a FT response 78. At this point, the RAP2 24 begins attempting to forward data traffic to the MT 28 at step 80 and the RLA/RRM 32 sends a DTC allocate response 82 to the HM/PSM 34 to indicate that the DTC allocation is complete.

As depicted in FIG. 3, the HM/PSM 34 next sends a Segmentation and Distribution Unit (SDU) allocate request 84 to the RLA/RRM 32, the SDU allocate request 84 indicating parameters related to the MT 28. The RLA/RRM 32 then allocates an SDU within the new $\beta_{1,2}$ sector to the MT 28 at step 86 if sufficient resources allow it and sends an SDU allocate response 88 back to the HM/PSM 34 to indicate that the SDU allocation is complete.

Once the SDU allocation is done, the HM/PSM 34 sends a connection request 90 to the CMAN 36, the request 90 including parameters indicating the end point resources utilized with the new established DSC and DTC. The CMAN 36 then establishes a new call tree with these parameters for the MT 28 within a connection table at step 92 and sends a connection response 94 to the HM/PSM 34 to indicate that the connection has been recorded.

Finally, the HM/PSM 34 inserts the connection specifics within a local table of the HM at step 96 and sends a HandOff (HO) message 98, via the previous DSC consisting of the RLA/RRM 32 and RAP1 20, to the MT 28 which informs the MT 28 of its new assigned channels and pilot sets. The MT 28 uses this information to update its pilot sets at step 100, begins to listen to the new DSC and DTC at step 102 and sends a HO complete message 104 back, via the previous DSC, to the HM/PSM 34. At this point, the MT 28 starts to send reverse traffic in the new DSC and DTC at step 106 which are received at the RLA/RRM 32 at step 108 while the HM/PSM 34 begins to terminate the previous channels via RAP1 20.

To terminate the previous channels, the HM/PSM 34 sends a disconnect request 110 to the CMAN 36 that indicates the resources of the previous SDU, DSC and DTC that should be de-allocated. Subsequently, the CMAN 36 requests the RLA/RRM 32 to de-allocate the SDU by sending an SDU de-allocate request 112 that indicates the SDU of the previous connection, the RLA/RRM 32 de-allocates the SDU of the previous connection at step 114 and the RLA/RRM 32 sends a SDU de-allocate response 116 to the CMAN 36. Next, a similar termination procedure is conducted for the DSC and DTC of the previous connection. For this, the CMAN 36 sends respective DSC and DTC de-allocate requests 118, 124 to the RLA/RRM 32, the RLA/RRM 32 performs the DSC and DTC de-allocations at respective steps 120, 126 and the RLA/RRM 32 sends respective DSC and DTC de-allocate responses 122, 132 to the CMAN 36 to indicate that the de-allocation has occurred. Prior to the sending of the DTC de-allocate response, the RLA/RRM 32 further sends a stop FT request 128 to the RAP1 20 at which point the RAP1 20 stops attempting to forward data traffic to the MT 28 and sends a stop FT response 130 to the RLA/RRM 32.

At this point, the CMAN 36 updates, at step 134, a connection table with the details of the new connection for MT 28, thus indicating that the network resources of the previous connection are free to be used for other connections. Finally, the CMAN 36 sends a disconnect response 136 to the HM/PSM 34 and the HM/PSM 34 removes the old connection from its local table at step 138.

The procedure described above for a well-known hard handoff of a MT from a first RAP to a second RAP is specific to the case in which all resources necessary for the connection between the MT and the second RAP are available. For instance, for the above described procedure to operate properly, sufficient bandwidth must exist to establish the DSC and DTC, among other network resource issues. If any of the necessary network resources are unavailable, the hard handoff will fail and the connection between the MT and the wireless network will be torn down along with the associated packet data session.

Once there are sufficient resources to allow for the connection to be made between the MT and the second RAP, a connection can be reinitiated followed by an initiation of a new packet data session. Problems with this situation include the considerable amount of control signalling that is necessary to establish a new packet data session as well as the customer dissatisfaction that is generated due to the inconvenience that results from initiating a new packet data session.

Figure 4:
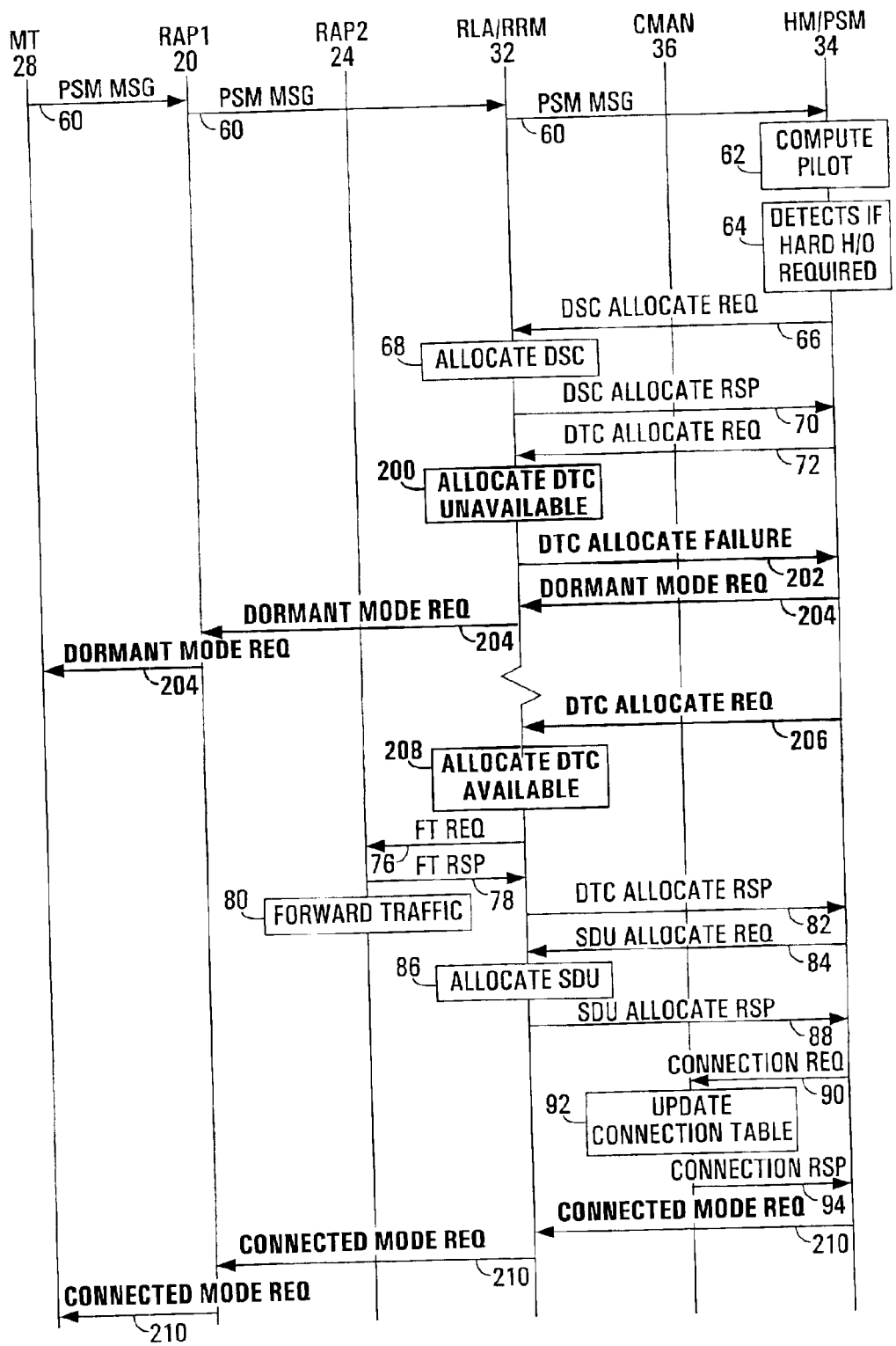
FIG. 4 is a signalling diagram illustrating a subset of the control signalling messages of FIG. 3 performed during a sample hard handoff according to the present invention.

FIG. 4 is a signalling diagram illustrating a modified subset of the control signalling messages of FIG. 3 performed during a sample hard handoff according to the present invention. In this subset of control signalling messages, the capability of the MT 28 to be placed into a dormant mode is taken advantage of. As depicted in the sample hard handoff of FIG. 4, the control signalling and operational steps 60 through 72 operate as previously described with reference to FIG. 3. The MT 28 sends a PSM message 60 to the HM/PSM 34 via RAP1 20 and RLA/RRM 32; the HM/PSM 34 decides that a hard handoff is necessary at steps 62 and 64; the HM/PSM 34 proceeds to have the RLA/RRM 32 allocate a DSC for the new connection at step 68; and the HM/PSM 34 requests for a DTC for the new connection to be allocated by the RLA/RRM 32 by sending a DTC allocate request 72.

Subsequently in this sample hard handoff procedure, the RLA/RRM 32 determines that the allocation of the requested DTC is not possible as depicted at step 200. This determination could occur for a number of reasons including the RAP2 24 having insufficient resources to accommodate the MT 28 within the $\beta_{1,2}$ sector or the RAP2 24 prioritizing other MTs above the MT 28. Once the determination is made that the allocation of a DTC for the MT 28 is not possible, the RLA/RRM 32 sends a DTC allocate failure message 202 to the HM/PSM 34. At this point in the well-known hard handoff procedure of FIG. 3, the HM/PSM 34 would send the disconnect request 110 to the CMAN 36 to initiate the disconnecting of the MT 28 from the network and the signalling and control steps 112 through 138 would proceed.

Within the sample implementation of the present invention depicted in FIG. 4, when the allocation of a DTC for the MT 28 within the new sector is not possible, the HM/PSM 34 sends a dormant mode request 204 to the RLA/RRM 32 which is subsequently forwarded to the MT 28 via the RAP1 20. Once received, this dormant mode request 204 instructs the MT 28 and the RAP1 20 to place all signalling and traffic channels between the devices into the dormant state such that neither device utilizes the established channels.

Next, the HM/PSM 34 continues to periodically send DTC allocate requests 206 to the RLA/RRM 32, similar to the DTC allocate request 72. Each time the RLA/RRM 32 receives a DTC allocate request 206, a determination is made whether the requested allocation of a DTC is possible for the MT 28 within the new $\beta_{1,2}$ sector. If the allocation of the DTC continues not to be possible, for such reasons as insufficient network resources to accommodate the DTC, the RLA/RRM 32 continues to send DTC allocate failure messages to the HM/PSM 34. On the other hand, if the RLA/RRM 32 determines that it is possible to allocate a DTC for the MT 28 within the new $\beta_{1,2}$ sector, the RLA/RRM 32 allocates the DTC at step 208, sends a FT request 76 to the RAP2 24 and, once a FT response 78 is received from the RAP2 24, sends a DTC allocate response 82 to the HM/PSM 34. At this point, the hard handoff procedure of FIG. 3 continues at step 84 by sending an SDU allocate request 84 to the RLA/RRM 32, the RLA/RRM 32 allocating an SDU within the new $\beta_{1,2}$ sector to the MT 28 at step 86 if sufficient resources allow it and the RLA/RRM 32 sending an SDU allocate response 88 back to the HM/PSM 34 to indicate that the SDU allocation is complete. Next, the HM/PSM 34 sends a connection request 90 to the CMAN 36, the CMAN 36 establishes a new call tree with these parameters for the MT 28 within a connection table at step 92 and the CMAN 36 sends a connection response 94 to the HM/PSM 34 to indicate that the connection has been recorded.

At this point, the HM/PSM 34 sends a connected mode request 210 to the MT 28 via the RLA/RRM 32 and the RAP1 20 prior to continuing with the hard handoff procedure of FIG. 3 at step 90. The connected mode request 210 instructs the MT 28 and the RAP1 20 to return to the connected mode in which they can communicate over the previously established signalling and traffic channels. After the sending of the connected mode request 210 from the HM/PSM 34, the hard handoff procedure of FIG. 3 continues at step 96.

The time between the MT 28 receiving the dormant mode request 204 and receiving the connected mode request 210 is critical to the proper maintenance of the packet data session during a hard handoff in which there is a temporary lack of sufficient resources within the new sector. This time lag is critical since well-known protocols utilized within packet data sessions generally have predetermined wait times in which devices utilizing the protocol wait can for a response to a data request prior to declaring an error with the transmission. If the delay between receiving the dormant mode request 204 and receiving the connected mode request 210 is too large (i.e. too large a time period in which insufficient resources are available in the new sector), than the error that results will cause the packet data session to be terminated at the MT 28 level. The termination of the packet data session at the MT 328 will result in the need for initiation of a new packet data session once the MT 28 the hard handoff has been completed, thus removing the benefit of the present invention.

It should be recognized that different packet data session protocols would have different lengths for their wait times. If the wait time is relatively short, the chances that a transmission error is detected while the MT 28 is within the dormant mode is higher while, if the wait time is relatively long, the chances are lower. In some protocols, it could be conceivable that the wait time does not exist and so this problem of transmission errors occurring while the MT 28 is within the dormant mode is not relevant.

Although the signalling diagram of FIG. 4 illustrates a sample hard handoff procedure in which a failure occurs when allocating the new DTC, it should be recognized that the present invention could be expanded such that a similar procedure of requesting a dormant mode occurs in cases that any required network resources cannot be allocated to the new connection. For instance, if insufficient network resources do not allow a DSC or SDU to be allocated to the MT 28 within the new sector, a similar dormant mode request could be sent to the MT 28 and the RAP1 20.

Yet further, although the signalling diagram of FIG. 4 illustrates the case in which a connected mode request is sent from the HM/PSM 34 after the completion of the SDU allocation, this is not meant to limit the scope of the present invention. In alternative embodiments, a connected mode request is sent after receiving the DTC allocate response 82.

Figure 5:
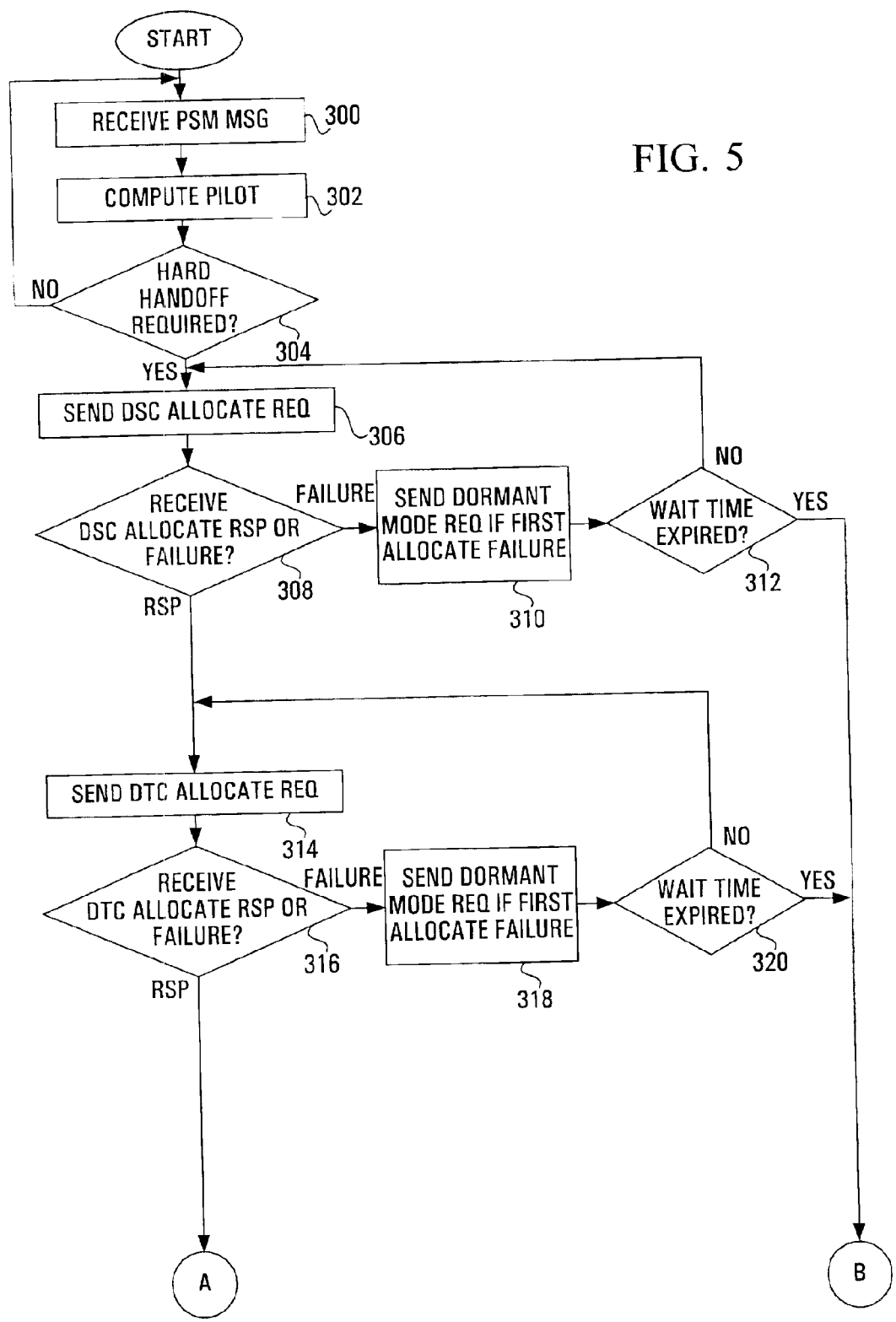
FIG. 5 is a flow chart illustrating the steps performed by the Handoff Manager (HM) of FIG. 2 in an embodiment of the present invention.
Figure 5:
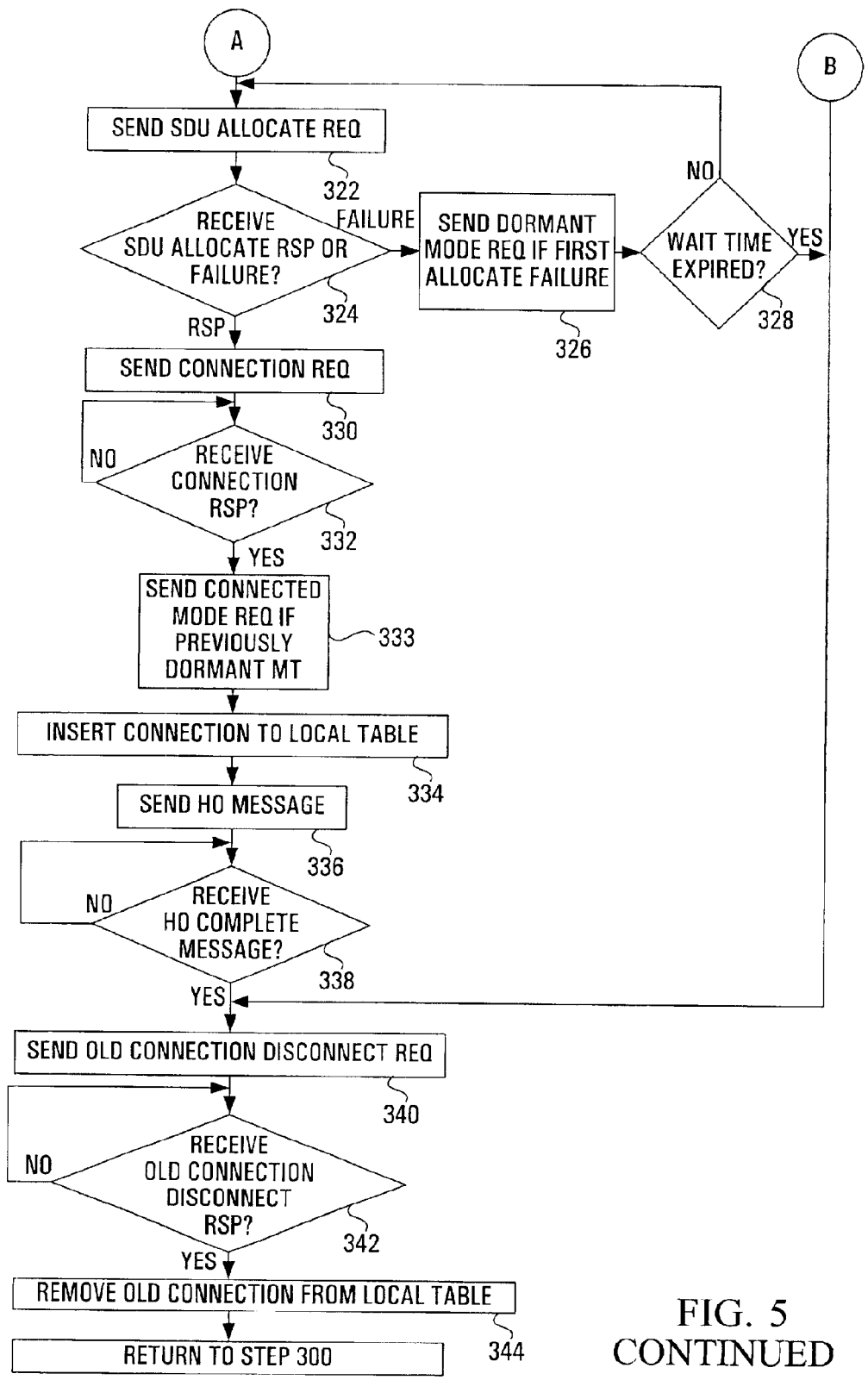

FIG. 5 is a flow chart illustrating the steps performed by the HM/PSM 34 in an embodiment of the present invention in which a similar procedure to that illustrated in the example of FIG. 4 occurs in the case of any failure to allocate network resources. Initially within the flow chart of FIG. 5, the HM/PSM 34 receives a PSM message from a MT at step 300, computes the pilot for the MT at step 302 and determines if a hard handoff is required at step 304. If a hard handoff is not required, the procedure returns to step 300 as depicted within FIG. 5. It is noted that the HM/PSM 34 would also determine whether a soft handoff should occur, though this is not shown within FIG. 5 as it is not directly relevant to the present invention.

If a hard handoff is required at step 304, the HM/PSM 34 next sends a DSC allocate request to the RLA/RRM 32 at step 306 and waits for either a positive response to the DSC allocate request or a failure message at step 308. If a failure response is received at step 308, the HM/PSM 34 sends a dormant mode request to the MT and its RAP via the RLA/RRM 32 at step 310 if the MT is not previously within the dormant mode. Subsequently, the HM/PSM 34 determines if the wait time for the particular packet data session protocol that is used has expired at step 312. In alternative embodiments of the present invention, no determination is made with respect to the expiration of the wait time of the packet data session protocol. The advantage of having such a wait time expiration detection is the added ability to avoid further signalling in cases that the packet data session has already terminated. If the wait time has not expired at step 312, the HM/PSM 34 returns to step 306 while, if the wait time has expired, the HM/PSM 34 proceeds to disconnect the current connection with the MT as will be described below.

If a positive response is received from the RLA/RRM at step 308, the HM/PSM 34 proceeds to send a DTC allocate request to the RLA/RRM 32 at step 314 and monitor at step 316 for a positive response or a failure message in response to the DTC allocate request. If a failure message is received at step 316, the HM/PSM 34 proceeds to send a dormant mode request to the MT and its RAP at step 318 if the MT has not previously been instructed to be in the dormant mode. Further, the HM/PSM 34 determines if the wait time has expired at step 320 similar to step 312. If the wait time has not expired, the HM/PSM 34 returns to step 314 while, if the wait time has expired, the HM/PSM 34 proceeds to disconnect the current connection with the MT as will be described below.

If a positive response is received at step 316, the HM/PSM 34 sends an SDU allocate request to the RLA/RRM 32 at step 322 and monitors at step 324 for a positive response or a failure message from the RLA/RRM 32. If a failure message is received at step 324, the HM/PSM 34 sends a dormant mode request to the MT and its RAP at step 326 if the MT is not previously within the dormant mode. Next, the HM/PSM 34 determines if the wait time has expired at step 328 similar to steps 312 and 320 described above. If the wait time has not expired at step 328, the HM/PSM 34 returns to step 322 while, if the wait time has expired, the HM/PSM 34 proceeds to disconnect the current connection with the MT as will be described herein below.

If, at step 324, a positive response is received, the HM/PSM 34 sends a connection request to the CMAN 36 at step 330 in order to update the connection table within the CMAN 36 and subsequently monitors for a connection response from the CMAN 36 at step 332. Once the connection response is received at step 332, the HM/PSM 34 sends a connected mode request to the MT and its RAP at step 333 if the MT was previously instructed to be placed into the dormant mode. Next, the HM/PSM 34 inserts the connection details within a local table at step 334 and sends a handoff message to the MT via the RLA/RRM 32 and its current RAP at step 336, this handoff message instructing the MT to update its pilot sets and listen to the new channels within the new sector. The HM/PSM 34 then monitors for a handoff complete message at step 338.

Once the HM/PSM 34 has received the handoff complete message at step 338 or the wait time expires at any one of steps 312, 320 or 328, the HM/PSM 34 next proceeds to disconnect the old connection utilized by the MT. To do this, the HM/PSM 34 sends an old connection disconnect request to the CMAN 36, the CMAN 36 then coordinating the de-allocation of the SDU, DTC and DSC of the previous connection. Next, the HM/PSM 34 monitors for an old connection disconnect response from the CMAN 36 at step 342. Once this old connection disconnect response is received, the HM/PSM 34 removes the old connection details from its local table at step 344 and returns to step 300 in which it monitors for PSM messages that might indicate that a hard handoff needs to be performed for a particular MT.

The above description of a procedure performed within the HM/PSM 34 is only one particular implementation of the present invention. It should be understood that there are numerous possible alternative embodiments of the present invention. For instance, the HM/PSM 34 could have less direct control over the DSC, DTC and SDU allocation or could have more control over the de-allocation of the network resources of the old connection. Further, the HM/PSM 34 could only send dormant mode requests for particular network resource allocation failures rather than for any such failure as shown in FIG. 5. Yet further, it should be recognized that the procedure of FIG. 5 is specific to the HM/PSM 34 being used for a single MT, though in reality the HM/PSM 34 could be performing this procedure (at different steps within the procedure) for a plurality of MTs within a plurality of different sectors controlled by a plurality of different RAPs. Even further, it should be recognized that the connected mode request could be sent at alternative points within this procedure. For instance, the connected mode request could be performed after any positive allocation response (such as after steps 308, 316 and 324) if a dormant mode request was sent previously. Also, in alternative embodiments, additional dormant mode requests and/or connected mode requests could be sent by the HM/PSM 34 with the requests being ignored if the MT is already within the requested mode.

As well, although the present invention has been described above with particular steps indicating times in which it is determined whether the wait time has expired, this should not limit the present invention. In some embodiments of the present invention, the wait time is consistently being determined, a wait time flag being triggered if the wait time expires. In this case, after the wait time flag is triggered, the procedure proceeds to step 340 and the disconnecting of the old connection.

Although the description of the present invention above is specific to the wireless network architecture of FIG. 2, it should be understood that this is not meant to limit the scope of the present invention. More or less components could work together to perform a hard handoff procedure of a MT. Further, the decision to send a dormant mode request and subsequently a connected mode request to a MT could be made in another component besides the HM/PSM as described above. For instance, the decision to send a dormant mode request to a MT could be generated within the RLA/RRM or another device that is aware of network resource allocation failures.

The present invention has been described herein above as being implemented within a hard handoff procedure. Alternative embodiments of the present invention are implemented within other situations in which a lack of network resources makes a connection for a MT temporarily disconnected. In such a situation, the forcing of the MT into a dormant mode can preserve the packet data session while the wireless network attempts to reconnect the connection.

One possible implementation of the present invention in which such a situation occurs is with respect to a first MT being handed off by a first sector while there is not sufficient network resources to accommodate it within a new sector. In this case, a second MT within the sector that is within a packet data session could be put within a dormant mode while the first MT utilizes the network resources of the second MT. Subsequently, as network resources become available, the connection for the second MT could be re-established. In this implementation, a priority system could dictate which MT is put into the dormant mode to accommodate the first MT. If the first MT is of a relatively high priority level, a MT with a relatively low priority could be put into the dormant mode to allow for sufficient resources to be provided to the first MT.

In another possible implementation of the present invention in which the placement of a MT within a dormant mode could be performed is in case of other situations of a cell overload condition. Similar to described above, in the case that a network detects a cell overload condition, the network can place one or more MT within the dormant mode. In this situation, the selection of MTs to be placed within the dormant mode is made based upon a priority system similar to that described above.

Within any of the embodiments of the present invention, a controlling element within a network, preferably a RAP, can maintain an internal queue of MTs that have been forced into the dormant mode or have been forced to remain in dormant mode after they requested transition into an connected mode. In the case that a queue system is utilized, the network can control the packet data load within a particular sector or cell by waking up (i.e. forcing into connected mode) MTs according to a predetermined queuing discipline. This predetermined queuing discipline could be based upon a number of different techniques such as a pure priority system, a round robin system or a weighted fair share system. In some embodiments, a maximum dormant time that a MT can be forced to remain in the dormant mode between "awakenings" can be determined based upon a minimum level of QoS required by a particular application. In these embodiments, this maximum dormant time is the time in which the application can be maintained with minimum functionality before application errors occur. Preferably, any queue system that is utilized would attempt to ensure no MT exceeded its corresponding maximum dormant time.

The use of the present invention in general can preferably allow for an increased flexibility for the wireless network, increased cell breathing without effecting the quality of service of the network as a whole and increased survivability for individual subscribers.

Throughout the above description, the present invention is assumed to be used for data traffic within packet data session. It should be recognized that the present invention could further be used for packet-based voice traffic such as Voice over Internet Protocol (VoIP) traffic. In this case, a warning is preferably given the users of the VoIP terminals that their connection will be placed on hold when one of the terminals receives the dormant mode request.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

We claim:

1. A computing apparatus for handling hard handoffs within a wireless network in which mobile terminals can be in communication with a first radio sector, the computing apparatus comprising:
   hard handoff determination logic that operates to determine if a hard handoff from the first radio sector to a second radio sector is desirable for at least one mobile terminal; and
   network resource allocation logic that is triggered by the hard handoff determination logic, if the hard handoff is necessary, and operates to request allocation of at least one network resource associated with the second radio sector for at least one mobile terminal; to determine if the allocation of the at least one network resource associated with the second radio sector is successful; and, if the allocation fails, to request the at least one mobile terminal be placed within a dormant mode, in which communication between the at least one mobile terminal and the first radio sector is suspended.

2. A computing apparatus according to claim 1, wherein the network resource allocation logic further operates to continue to request allocation of the at least one network resource associated with the second radio sector for the at least one mobile terminal after the allocation has previously failed; to determine if the allocation of the at least one network resource associated with the second radio sector is successful after the allocation has previously failed; and, if the allocation is successful, to request the at least one mobile terminal be placed within a connected mode, in which communication between the at least one mobile terminal and the second radio sector is established.

3. A computing apparatus according to claim 2, wherein, if a plurality of mobile terminals have been placed within the dormant mode, the network resource allocation logic further operates to select a predetermined queue order for requesting the dormant mobile terminals to be placed within the connected mode.

4. A computing apparatus according to claim 1, wherein the hard handoff determination logic operates to determine if a hard handoff is necessary for the at least one mobile terminal by receiving and processing Pilot Strength Measurement (PSM) messages from the at least one mobile terminal.

5. A computing apparatus according to claim 1, wherein, if the allocation of the at least one network resource associated with the second radio sector for the at least one mobile terminal is successful, the network resource allocation logic further operates to request the de-allocation of any network resources associated with the first radio sector for the at least one mobile terminal.

6. A computing apparatus according to claim 1, wherein the network resource allocation logic further operates to request allocation of the at least one network resource associated with the second radio sector for the at least one mobile terminal if the allocation has previously failed; to determine if the allocation of the at least one network resource associated with the second radio sector is successful after a previous failure; and, if the allocation is successful, to request the at least one mobile terminal be placed within a connected mode, in which communication between the at least one mobile terminal and the second radio sector is established.

7. A computing apparatus according to claim 6, wherein the network resource allocation logic further operates to determine whether a predetermined time period has expired since the at least one mobile terminal has been requested to be placed within the dormant mode and, if the predetermined time period has expired, to request the de-allocation of any network resources associated with the first radio sector for the at least one mobile terminal.

8. A computing apparatus according to claim 1, wherein the at least one network resource associated with the second radio sector comprises a Data Traffic Channel (DTC) between the at least one mobile terminal and a Radio Access Port (RAP).

9. A computing apparatus according to claim 1, wherein the at least one network resource associated with the second radio sector comprises a Dedicated Signalling Channel (DSC) between the at least one mobile terminal and a Radio Access Port (RAP).

10. A computing apparatus according to claim 1, wherein the at least one network resource associated with the second radio sector comprises a Segmentation and Distribution Unit (SDU) within a Radio Access Port (RAP).

11. A computing apparatus according to claim 1, wherein the network resource allocation logic requesting the at least one mobile terminal be placed within a dormant mode comprises requesting the at least one mobile terminal to suspend communications on any of its previously established communication channels.

12. A computing apparatus according to claim 2, wherein the network resource allocation logic requesting the at least one mobile terminal be placed within the dormant mode comprises requesting the at least one mobile terminal to suspend communications on any of its previously established communication channels; and
   wherein the network resource allocation logic requesting the at least one mobile terminal be placed within the connected mode comprises requesting the at least one mobile terminal to end the suspension of communications on its previously established communication channels.

13. A computing apparatus according to claim 1, wherein the network resource allocation logic determining if the allocation of the at least one network associated with the second radio sector is successful comprises monitoring for an allocation failure message, the reception of the allocation failure message indicating that the allocation of at least one network resource associated with the second radio sector failed.

14. A computing apparatus arranged to control allocation of network resources for a mobile terminal from a first radio sector to a second radio sector during a hard handoff of a communication link with the mobile terminal from the first radio sector to the second radio sector, the computing apparatus comprising:

means for determining if a hard handoff from the first radio sector to the second radio sector is desirable for the mobile terminal;

means for attempting allocation of at least one network resource associated with the second radio sector for the mobile terminal if the hard handoff is desirable;

means for determining if the allocation of the at least one network resource associated with the second radio sector is successful; and means for requesting the mobile terminal be placed within a dormant mode if the allocation of the at least one network resource associated with the second radio sector fails, in which communication between the mobile terminal and first radio sector,s suspended.

15. A computing apparatus according to claim 14, wherein the means for attempting allocation of at least one network resource associated with the second radio sector for the mobile terminal and the means for determining if the allocation is successful continue to operate after the allocation has previously failed; and wherein the computing apparatus further comprises means for requesting the mobile terminal be placed within a connected mode if the allocation is successful after a previous failure.

16. A computing apparatus according to claim 14, further comprising means for requesting de-allocation of any network resources associated with the first radio sector for the mobile terminal if the allocation of the at least one network resource associated with the second radio sector for the mobile terminal is successful.

17. A method for allocating network resources, during a hard handoff from a first radio sector to a second radio Sector, for a mobile terminal comprising:

determining if a hard handoff from the first radio sector to the second radio sector is desirable for the mobile terminal;

attempting to allocate at least one network resource associated with the second radio sector to the mobile terminal if the hard handoff is desirable; and if the allocation of the at least one network resource fails, requesting the mobile terminal be placed within a dormant mode, in which communication between the mobile terminal and the radio sector is suspended.

18. A method according to claim 17, further comprising:

attempting to allocate the at least one network resource associated with the second radio sector to the mobile terminal after the allocation has previously failed; and if the allocation of the at least one network resource is successful after previously failing, requesting the mobile terminal be placed within a connected mode.

19. A method for performing a hard handoff of a mobile terminal from a first radio sector to a second radio sector comprising:

determining if a hard handoff from the first radio sector to the second radio sector is desirable for the mobile terminal;

determining if network resources of the second radio sector are sufficient for the mobile terminal if the hard handoff is desirable; and if the network resources of the second radio sector are not sufficient for the mobile terminal, instructing the mobile terminal to be placed within a dormant mode until sufficient network resources for the mobile terminal are available, in which communication between the mobile terminal and the first radio sector is suspended.

20. A computing apparatus for handling hard handoffs within a wireless network in which mobile terminals can be in communication with a first radio sector, the computing apparatus comprising:

hard handoff determination logic that operates to determine if a hard handoff from the first radio sector to a second radio sector is necessary for the at least one mobile terminal; and network resource allocation logic that is triggered by the hard handoff determination logic, if the hard handoff is necessary, and operates to determine the availability of at least one network resource associated with the second radio sector and, if the at least one network resource associated with the second radio sector is determined to have insufficient bandwidth for current traffic, to request at least one of the mobile terminals be placed within a dormant mode, in which communication between the at least one of the mobile terminals and the first radio sector is suspended.

21. A computing apparatus according to claim 20, wherein the network resource allocation logic selects the at least one of the mobile terminals to be placed within a dormant mode based upon a priority system.

22. A computing apparatus at according claim 20, wherein the network resource allocation logic further operates to determine the availability of the at least one network resource associated with the second radio sector and, if the at least one network resource associated with the second radio sector is determined to have sufficient bandwidth for current traffic and the mobile terminal placed within the dormant mode, to request the mobile terminal be placed within a connected mode, in which communication between the at least one mobile terminal and second radio sector is established.

23. A computing apparatus according to claim 22, wherein, if a plurality of mobile terminals have been placed within the dormant mode, the network resource allocation logic further operates to select a predetermined queue order for requesting the dormant mobile terminals to be placed within the connected mode with the second radio sector.

* * * * *